United States Patent
Fukunaga et al.

(10) Patent No.: US 9,253,336 B2
(45) Date of Patent: Feb. 2, 2016

(54) IMAGE READING APPARATUS, AND IMAGE READING METHOD

(71) Applicant: FUJI XEROX CO., LTD., Tokyo (JP)

(72) Inventors: Kazuya Fukunaga, Kanagawa (JP); Kiyofumi Aikawa, Kanagawa (JP); Takashi Hiramatsu, Kanagawa (JP); Michio Kikuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/293,232

(22) Filed: Jun. 2, 2014

(65) Prior Publication Data

US 2015/0131131 A1    May 14, 2015

(30) Foreign Application Priority Data

Nov. 13, 2013    (JP) .................................. 2013-235109

(51) Int. Cl.
*H04N 1/46* (2006.01)
*H04N 1/00* (2006.01)
*H04N 1/60* (2006.01)

(52) U.S. Cl.
CPC ....... *H04N 1/00005* (2013.01); *H04N 1/00039* (2013.01); *H04N 1/6044* (2013.01); *H04N 2201/0005* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 2002/0051252 | A1* | 5/2002 | Chang et al. | 358/505 |
| 2003/0011798 | A1* | 1/2003 | Yamamoto et al. | 358/1.9 |
| 2012/0249633 | A1* | 10/2012 | Tanaka | 347/9 |
| 2014/0085647 | A1* | 3/2014 | Hirano | 358/1.9 |
| 2014/0203700 | A1* | 7/2014 | Inada et al. | 313/116 |
| 2014/0253931 | A1* | 9/2014 | Hashizume | 358/1.9 |

FOREIGN PATENT DOCUMENTS

| | | |
|---|---|---|
| JP | A-2007-201679 | 8/2007 |
| JP | A-2012-66591 | 4/2012 |

* cited by examiner

*Primary Examiner* — Helen Q Zong
(74) *Attorney, Agent, or Firm* — Oliff PLC (57) ABSTRACT

Provided is an image reading apparatus including an imaging unit that images light incident from a medium on which an image is formed, a measurement unit that measures a color value on an image, based on image data obtained by the imaging unit, in correspondence with a position on the image, a generation unit that generates error information indicating an error included in the color value according to the color value measured by the measurement unit and a relative position of the position on the image with respect to an optical axis of the imaging unit, and an output unit that outputs the error information generated by the generation unit and the measured color value.

8 Claims, 6 Drawing Sheets

| | L* | a* | b* | ΔE | |
|---|---|---|---|---|---|
| p1 | ... | ... | ... | ΔE1 | R |
| p2 | ... | ... | ... | ΔE2 | |
| p3 | ... | ... | ... | ΔE3 | |
| p4 | ... | ... | ... | ΔE4 | |
| p5 | ... | ... | ... | ΔE5 | |
| p6 | ... | ... | ... | ΔE6 | |
| p7 | ... | ... | ... | ΔE7 | |
| p8 | ... | ... | ... | ΔE8 | |

IMAGE READING APPARATUS, AND IMAGE READING METHOD

CROSS-REFERENCE TO RELATED APPLICATIONS

This application is based on and claims priority under 35 USC 119 from Japanese Patent Application No. 2013-235109 filed Nov. 13, 2013.

BACKGROUND

Technical Field

The present invention relates to an image reading apparatus, and an image reading method.

SUMMARY

According to an aspect of the invention, there is provided an image reading apparatus including:

an imaging unit that images light incident from a medium on which an image is formed;

a measurement unit that measures a color value on an image, based on image data obtained by the imaging unit, in correspondence with a position on the image;

a generation unit that generates error information indicating an error included in the color value according to the color value measured by the measurement unit and a relative position of the position on the image with respect to an optical axis of the imaging unit; and an output unit that outputs the error information generated by the generation unit and the measured color value.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
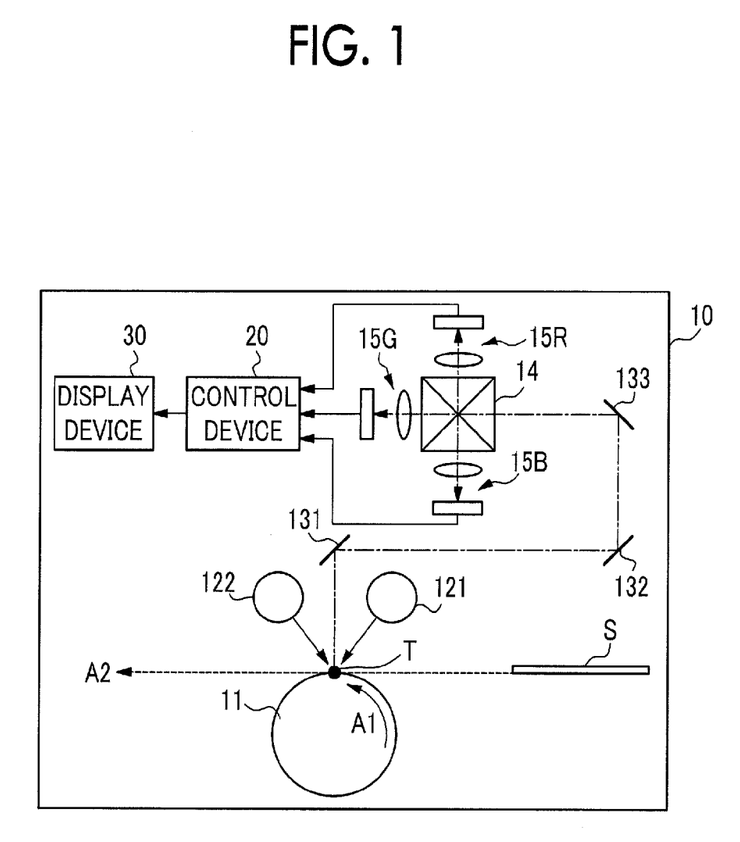
FIG. 1 is a diagram illustrating a configuration of an image reading apparatus according to a first exemplary embodiment.

FIG. 1 is a diagram illustrating a configuration of an image reading apparatus 10 according to a first exemplary embodiment. The image reading apparatus 10 has a function of imaging light from a color measurement object to read an image.

A transport medium 11 is a cylindrical member and rotates around the center of a cylinder. The transport medium 11 is rotated by a driving unit (not shown) such as a motor in an arrow A1 direction (counterclockwise). The transport medium 11 transports a sheet type medium S in an arrow A2 direction while being rotated. The sheet type medium S is an original document made of a medium such as a sheet or a resin material, for example, and an image (for example, a color image) of a text or a photo is formed on a front surface thereof. When the sheet type medium S is transported to the position of the transport medium 11, a portion thereof in an imaging region T is imaged to become a color measurement object.

A transport unit that transports the sheet type medium S includes components other than the transport medium 11, but description thereof will be omitted.

Each of light sources 121 and 122 includes a light-emitting element and a light guide member, for example, which irradiates the imaging region T on the sheet type medium S with light. For example, the light-emitting element is a white light emitting diode (LED), but may be a light-emitting element that emits light including three primary colors of red (R), green (G) and blue (B). Each of the light sources 121 and 122 forms the light emitted from the light-emitting element as light having a length direction in an axial direction of the transport medium 11 using the light guide member to irradiate the imaging region T.

Incident angles of the lights that are incident onto the sheet type medium S from the light sources 121 and 122 are the same herein, but may be different from each other.

Mirrors 131, 132 and 133 are reflective members that reflect the light incident from the imaging region T to be guided to a color separation prism 14. If the lights emitted from the light sources 121 and 122 are reflected from the imaging region T, the mirrors 131, 132 and 133 guide the reflected light (specifically, diffused reflected light) from the imaging region T to the color separation prism 14. A single-dot chain line shown in FIG. 1 represents an optical axis of an optical system of the image reading apparatus 10, and the reflected light from the imaging region T travels in an arrow direction of this line.

The color separation prism 14 is a color separation unit provided with a dichroic mirror, for example, and separates (disperses) the light (reflected light) incident from the imaging region T into lights having plural wavelength bands. Here, the color separation prism 14 separates the incident light into respective lights of three colors of R, G and B. The color separation prism 14 emits the R color light after separation toward an imaging unit 15R. The color separation prism 14 emits the G color light after separation toward an imaging unit 15G. The color separation prism 14 emits the B color light after separation toward an imaging unit 15B.

Instead of the color separation prism 14, for example, a color separation unit provided with a beam splitter and a color filter may be used, and a specific configuration of the color separation unit is not particularly limited.

The respective imaging units 15R, 15G and 15B are optical systems that image the light incident from the imaging region T. The letters at the end of the reference signs of the imaging units 15R, 15G and 15B correspond to the colors to be handled. The respective imaging units 15R, 15G and 15B have different colors to be handled, but have the same configuration. In the following description, when it is not necessary to particularly distinguish between the respective imaging units 15R, 15G and 15B, the letters at the end of the reference signs are not used, and are generally referred to as an "imaging unit 15".

Figure 2:
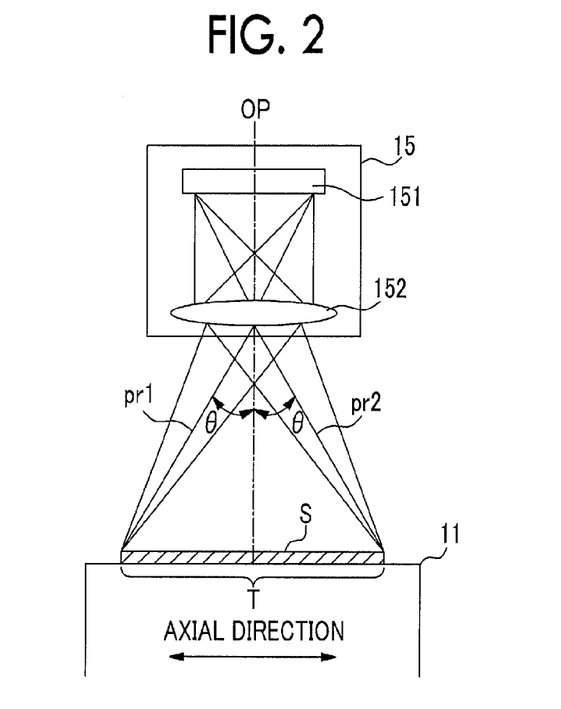
FIG. 2 is a diagram illustrating a configuration of an imaging unit according to the first exemplary embodiment.

FIG. 2 is a diagram illustrating a configuration of the imaging unit 15.

In FIG. 2, an optical path of light from the imaging region T on the sheet type medium S to the imaging unit 15 is shown. Respective solid lines with reference signs "pr1" and "pr2" represent outermost principal rays incident onto the imaging unit 15. A single-dot chain line with a reference sign "OP" represents an optical system of the image reading apparatus 10, more specifically, an optical axis of the imaging unit 15. A viewing angle (object side viewing angle) of the imaging unit 15 is represented as "θ". The viewing angle "θ" is represented as a viewing angle between the principal ray pr1 or pr2 and the optical axis OP, which is larger than zero. In this case, each of the principal rays pr1 and pr2 is not parallel to the optical axis OP (this includes a case where each of the principal rays pr1 and pr2 is considered as non-parallel to the optical axis OP). Here, the imaging region T is a region between the principal rays pr1 and pr2 on the sheet type medium S. The optical axis OP of the imaging unit 15 typically intersects with the center of the imaging region T.

As shown in FIG. 2, the imaging unit 15 includes an imaging element 151 and a lens 152. The imaging element 151 is an image sensor that uses a photodiode, for example, which functions as a unit that images incident light to output an image signal. The lens 152 is a convex lens, which functions as a unit that forms an image of the light incident from the imaging region T at the position of the imaging element 151.

The imaging unit 15 outputs the image signal output by the imaging element 151 to a control device 20.

The control device 20 shown in FIG. 1 includes an arithmetic processor such as a central processing unit (CPU), an image processing circuit such as an application specific integrated circuit (ASIC) and a memory, which functions as a unit that controls the respective units of the image reading apparatus 10. The arithmetic processor executes a program stored in the memory to control the respective units of the image reading apparatus 10. For example, the control device 20 generates image data (hereinafter, referred to as "imaged image data") including color expressing values in an RGB color space based on image signals of respective colors (color components) of R, G and B obtained from the respective imaging units 15R, 15G and 15B. The control device 20 performs color measurement of an image formed on the sheet type medium S based on the generated imaged image data, and generates and outputs color measurement data indicating the color measurement result.

A display device 30 is a liquid crystal display, for example, which functions as a unit that displays an image (screen). The display device 30 displays the color measurement result of the image formed on the sheet type medium S based on the color measurement data supplied from the control device 20.

Figure 3:
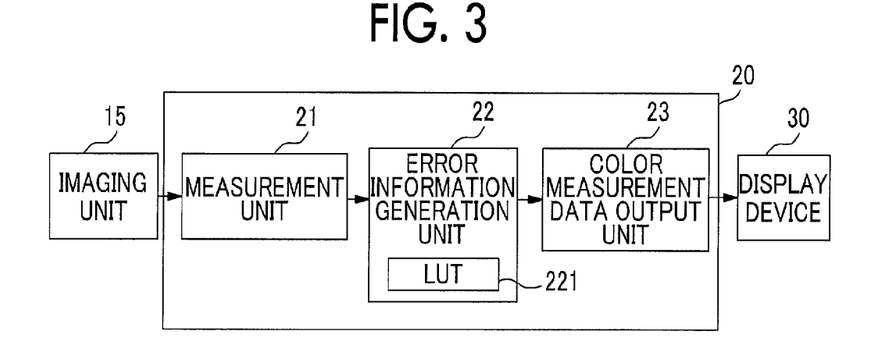
FIG. 3 is a diagram illustrating a functional configuration of a control device according to the first exemplary embodiment.

FIG. 3 is a diagram illustrating a functional configuration of the control device 20. The control device 20 executes a program to realize functions corresponding to a measurement unit 21, an error information generation unit 22 and a color measurement data output unit 23.

The measurement unit 21 (an example of a measurement unit) measures a color value on the image in correspondence with a position on the image based on the image data obtained by the imaging unit 15. Here, the color value is a color expressing value in a CIELAB color space. The CIELAB color space is a color space defined by a component L* related to brightness and components a* and b* related to hue and color saturation, and for example, is a color space of a color system recommended by Commission Internationale de l'Eclairage (CIE) in 1976. The CIELAB color space is an example of a color space that does not depend on the apparatus, which may be used for evaluation of color reproducibility, for example.

In order to measure the color value, the measurement unit 21 causes color conversion parameters to act on the imaged image data to perform color space conversion from the RGB color space to the CIELAB color space.

The color conversion parameters used by the measurement unit 21 represent an arithmetic expression for performing the color space conversion based on polynomial approximation, for example, but instead, a lookup table (LUT) where a correspondence relationship between the color expressing values in the RGB color space and the color values in the CIELAB color space is written may be used, for example.

The measurement unit 21 may measure the color value for each pixel of the image indicated by the imaged image data, or may measure the color value for each image region that is a cluster of plural pixels.

The error information generation unit 22 (an example of a generation unit) generates error information indicating an error (hereinafter, referred to as a "color measurement error") which is included in the color value measured by the measurement unit 21 based on an LUT 221.

The error information refers to information indicating, when the measurement of the color value is performed by the imaging unit 15, the degree of an error capable of being included in the measured color value. The LUT 221 is a lookup table for obtaining a color measurement error included in the color value according to the color value and a relative position of the measurement position of the color value with respect to the optical axis OP of the imaging unit 15. The error information generation unit 22 specifies the relative position with respect to the optical axis OP of the imaging unit 15 based on coordinates in the imaged image data or the image data after the color space conversion, for example. Here, a color measurement error written in the LUT 221 corresponds to a color difference in the CIELAB color space. For example, the LUT 221 is configured so that as the measurement position of the color value becomes distant from the optical axis OP or as the saturation specified from the color value becomes high, the color measurement error increases. This is based on the fact that as the position becomes distant from the optical axis OP of the imaging unit 15, a measurement error of colors having color saturation easily occurs. Subsequently, the reason why the LUT 221 has such a configuration will be described with reference to an image that is a color measurement object.

Figure 4:
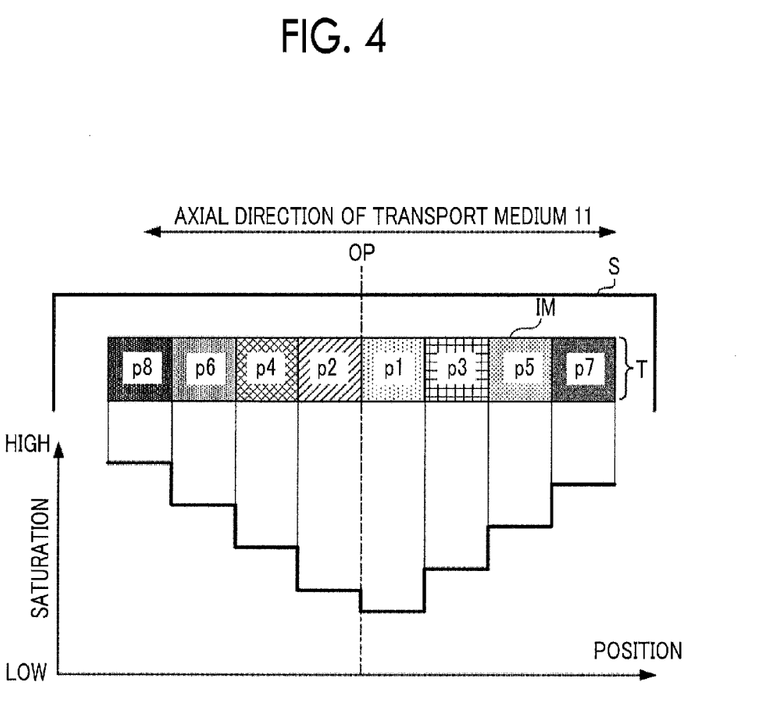
FIG. 4 is a diagram illustrating an example of an image that is a color measurement object according to the first exemplary embodiment.

FIG. 4 is a diagram illustrating an example of the image that is the color measurement object on the sheet type medium S.

As shown in an upper part in FIG. 4, an object image IN that is the color measurement object is an image where square images p1 to p8 are arranged in one row along the axial direction of the transport medium 11 on the sheet type medium S. Here, the imaging region T has the same range as that of the object image IM. Each of the images p1 to p8 represents a single color, which may be any color. Here, it is assumed that the images p1 to p8 have a color having color saturation and the saturation is different in each color. As shown in a lower part in FIG. 4, as the number at the end of the reference signs becomes small, the images p1 to p8 represent colors having low saturation. Further, as the number at the end of the reference signs becomes small, the images p1 to p8 are arranged in the vicinity of the optical axis OP of the imaging unit 15. Here, it is considered that the images p1 and p2, the images p3 and p4, the images p5 and p6 and the images p7 and p8 have the same distance from the optical axis OP, respectively.

Figure 5A:
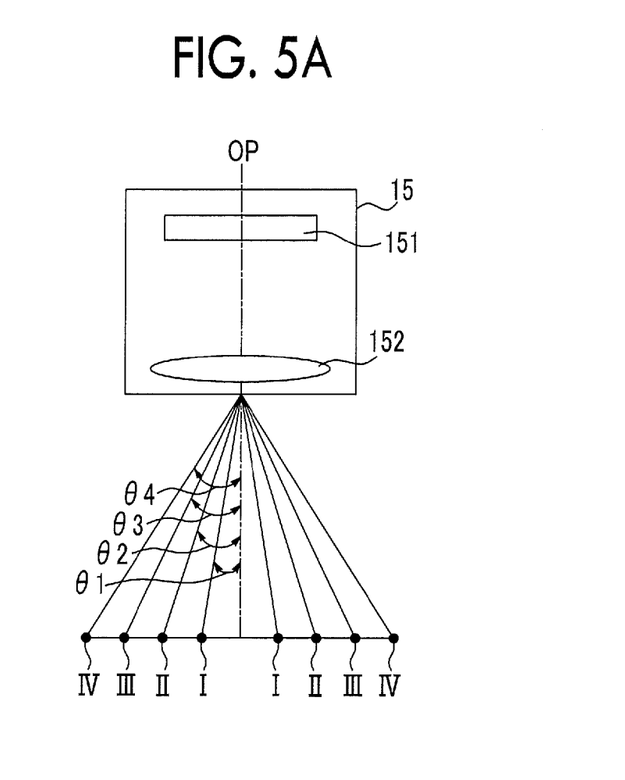
FIGS. 5A and 5B are diagrams illustrating a color measurement error due to a viewing angle of the imaging unit according to the first exemplary embodiment.
Figure 5B:
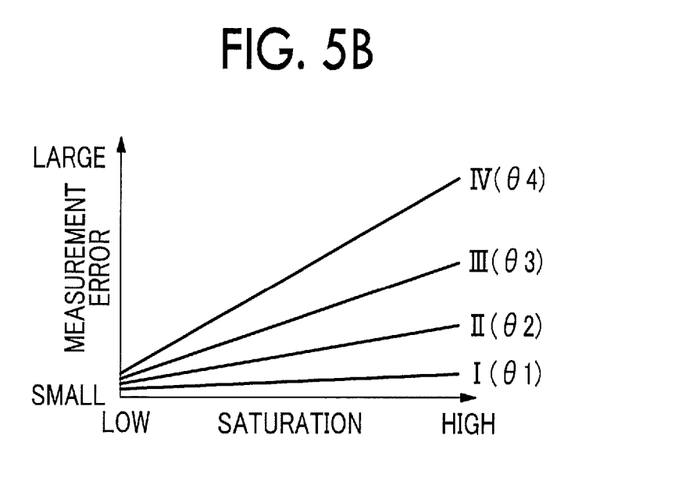

FIGS. 5A and 5B are diagrams illustrating a color measurement error due to a viewing angle of the imaging unit 15.

FIG. 5A shows the imaging unit 15 described in FIG. 2 and measurement positions I, II, III and IV that are different in distance from the optical axis OP. A measurement angle θ1 is an angle between a segment that connects the center of the lens 152 and the measurement position I and the optical axis OP. A measurement angle θ2 is an angle between a segment that connects the center of the lens 152 and the measurement position II and the optical axis OP. A measurement angle θ3 is an angle between a segment that connects the center of the lens 152 and the measurement position III and the optical axis OP. A measurement angle θ4 is an angle between a segment that connects the center of the lens 152 and the measurement position IV and the optical axis OP. FIG. 5B shows a graph that represents the relationship between saturation of a color of a measurement object (transverse axis) and a color measurement error (longitudinal axis) capable of being generated in the color measurement at each measurement position.

As understood with reference to FIGS. 5A and 5B, as the saturation becomes high, the color measurement error becomes large. Conversely, as the saturation becomes low, the color measurement error becomes small. Further, when the saturation of the color of the color measurement object is relatively low, the difference between the color measurement errors is relatively small at the respective measurement positions I, II, III and IV, but as the saturation of the color of the color measurement object becomes high, the difference between the color measurement errors is relatively large at the respective measurement positions I, II, III and IV. The imaging unit 15 performs the color measurement at measurement positions in the imaging region T based on the viewing angle θ, and the color measurement error based on the saturation easily appears at the measurement position where the above-described measurement angles (θ1 to θ4) are large.

Thus, when the object image IM is measured by the image reading apparatus 10, for example, the color measurement error increases in the order of the images p8, p7, p6, p5, p4, p3, p2 and p1. However, at the measurement position relatively close to the optical axis OP, since the color measurement error due to the saturation appears small, the color measurement error does not necessarily appear in the above-described order.

Since the color measurement error may occur as described above, the color measurement error is written in the LUT 221 in correspondence with a combination of the components a* and b* related to the saturation and the relative position of the measurement position with respect to the optical axis OP. In the LUT 221, in order to suppress increase in the amount of data, the color measurement error may be written in correspondence with a part of the combinations of the components a* and b* and the relative position of the measurement position with respect to the optical axis OP. In this case, with respect to the remaining combinations of which the color measurement error is not written in the LUT 221, the error information generation unit 22 calculates the color measurement error using an interpolation method such as linear interpolation.

In the example in FIGS. 5A and 5B, an example in which the color measurement error is linearly changed according to the change of the saturation is shown for simplicity of description, but this is only exemplary. Thus, the color measurement error based on the combination of the color values and the relative position of the measurement position with respect to the optical axis OP may be obtained by experiment or calculation to be written in the LUT 221.

The color measurement data output unit 23 (an example of an output unit) shown in FIG. 3 outputs measurement data including the error information generated by the error information generation unit 22 and the color values measured by the measurement unit 21. The measurement data is data in which the error information and the color values are associated with each other for each measurement position. Here, the color measurement data output unit 23 outputs the measurement data to the display device 30 for display.

Figure 6:
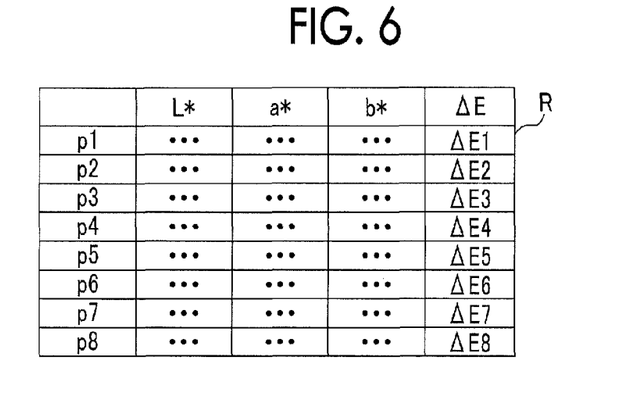
FIG. 6 is a diagram illustrating a configuration example of color measurement data according to the first exemplary embodiment.

FIG. 6 is a diagram illustrating a configuration example of the color measurement data.

The color measurement data output unit 23 allows the display device 30 to display the color measurement result according to measurement data R in which the color values (that is, L*, a* and b*) and the error information (color difference ΔE) indicating the color measurement error included in the color values are associated with each other, for each color included in the object image. A user who views the color measurement result displayed in the display device 30 recognizes the color values of the colors that form the image formed on the sheet type medium S, and recognizes the degree of the color measurement error capable of being included in the color values.

Here, the configuration of the color measurement data described in FIG. 6 is only exemplary. The color measurement data may include the color measurement error for each of the components L*, a* and b*, in addition to the color difference ΔE, for example. As long as the color measurement data is data including the color values and the error information that form the color measurement result, its data form is not particularly limited. Further, the display device 30 may display the image of the color measurement object, and may display the color measurement result at a position instructed by an operation of an operation device (not shown). The display form of the color measurement result based on the color measurement data in the display device 30 is not particularly limited.

Further, the color measurement data output unit 23 may output the color measurement data for storage to a storage unit such as a hard disk drive, or may transmit and output the color measurement data to an external device through a communication unit (not shown), without limiting the output to the display device 30. That is, an output destination or an output method of the color measurement data from the color measurement data output unit 23 is not particularly limited.

Second Exemplary Embodiment

A second exemplary embodiment of the invention will be described.

The image reading apparatus 10 according to the exemplary embodiment performs color measurement of an image based on image data for forming the image on a sheet type medium S.

In the following description, the same reference signs are given to the same components as in the first exemplary embodiment, and description thereof will not be repeated. Further, with respect to components in the second exemplary embodiment corresponding to those in the first exemplary embodiment, "a" is added at the end of the reference signs.

Figure 7:
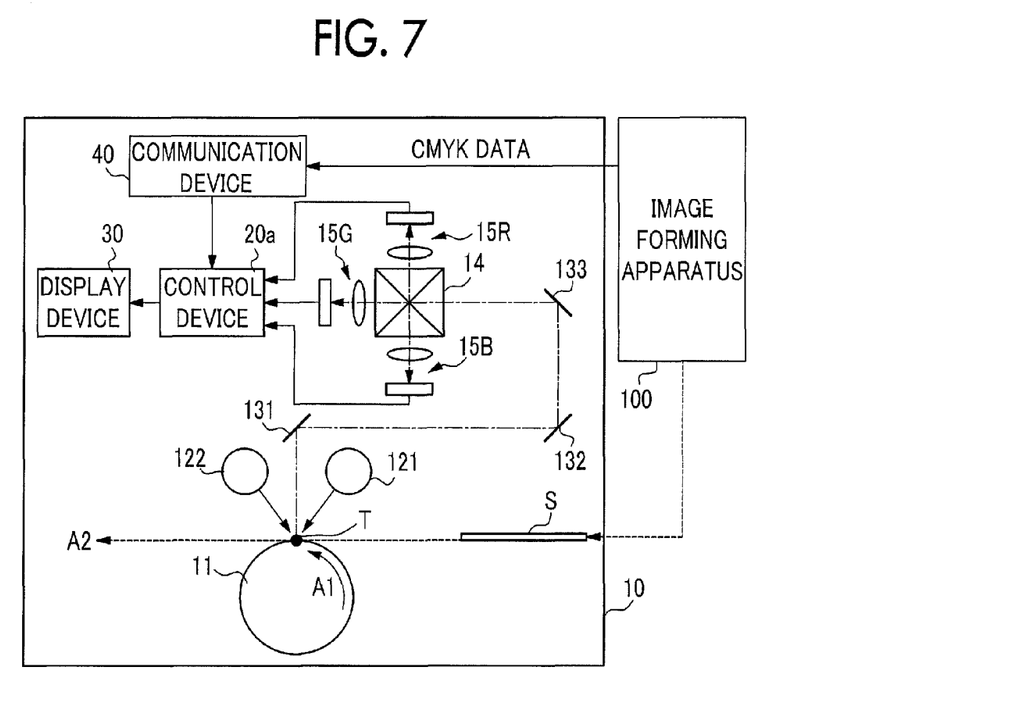
FIG. 7 is a diagram illustrating a configuration of an image reading apparatus according to a second exemplary embodiment.

FIG. 7 is a diagram illustrating the configuration of the image reading apparatus 10 according to the second exemplary embodiment.

The image reading apparatus 10 includes a communication device 40 that communicates with an image forming apparatus 100 that forms an image on a sheet type medium S. Here, the image forming apparatus 100 is a device that forms an image by an electrophotographic method using toner (that is, colorant) of four colors of cyan (C), magenta (M), yellow (Y) and black (K). If the image forming apparatus 100 forms an image on the sheet type medium S, the image forming apparatus 100 transports the sheet type medium S to be supplied to the image reading apparatus 10. Further, the image forming apparatus 100 transmits image data for forming the image on the sheet type medium S to the image reading apparatus 10. Further, the image data is image data (hereinafter, referred to as "CMYK data") including color expressing values of the CMYK color space. The color expressing values of the CMYK color space correspond to densities (that is, toner densities) of images of the respective color components of C, M, Y and K. If the CMYK data transmitted by the image forming apparatus 100 is received, the communication device 40 supplies the received CMYK data to a control device 20*a*.

If the control device 20*a* obtains the CMYK data through the communication device 40, the control device 20*a* generates color measurement data obtained by measuring the image formed on the sheet type medium S based on the obtained CMYK data and outputs the generated color measurement data.

Figure 8:
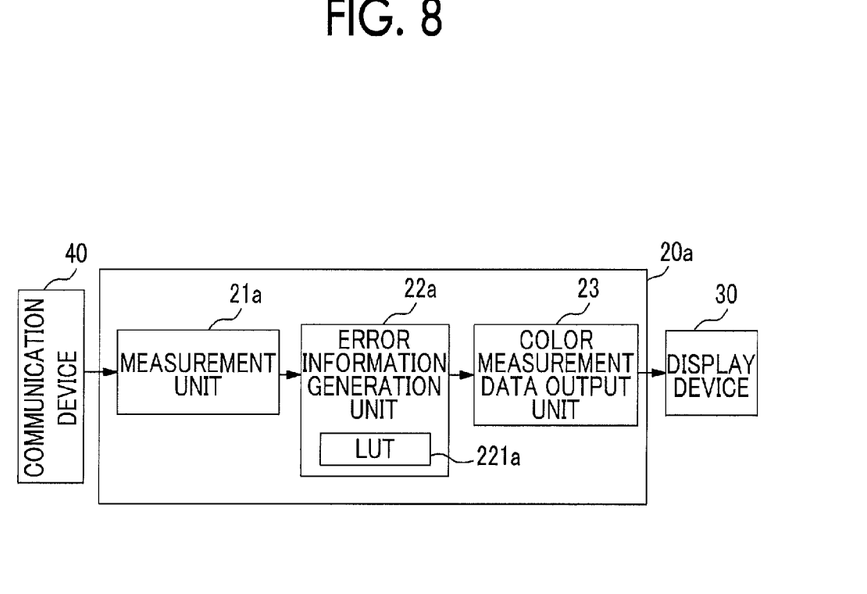
FIG. 8 is a diagram illustrating a functional configuration of a control device according to the second exemplary embodiment.

FIG. 8 is a diagram illustrating a functional configuration of the control device 20*a*. The control device 20*a* executes a program to realize functions corresponding to a measurement unit 21*a*, an error information generation unit 22*a* and the color measurement data output unit 23.

The measurement unit 21*a* (an example of a measurement unit) is a unit that measures a color value at a measurement position based on the CMYK data. Similarly to the above-described first exemplary embodiment, in order to measure the color value of the CIELAB color space, the measurement unit 21*a* causes color conversion parameters to act on the CMYK data obtained through the communication device 40 to perform color space conversion from the CMYK color space to the CIELAB color space.

The color conversion parameters used by the measurement unit 21*a* represent an arithmetic expression for performing the color space conversion based on polynomial approximation, for example, but instead, a lookup table where a correspondence relationship between the color expressing values in the CMYK color space and the color values in the CIELAB color space is written may be used, for example.

The error information generation unit 22*a* (an example of a generation unit) is a unit that generates error information indicating a color measurement error included in the color value measured by the measurement unit 21*a* based on an LUT 221*a*.

The error information is information indicating, when the image forming apparatus 100 measures the color value by the imaging unit 15 using the image formed on the sheet type medium S as an object, the degree of an error capable of being included in the measured color value. The error information generation unit 22*a* generates the error information according to the color value measured by the measurement unit 21*a* and a relative position of the color value at the measurement position with respect to the optical axis OP of the imaging unit 15. The error information generation unit 22*a* specifies the relative position with respect to the optical axis OP of the imaging unit 15 based on coordinates in the CMYK data or the image data after the color space conversion, for example. For example, the LUT 221*a* is configured so that as the measurement position of the color value becomes distant from the optical axis OP or as the saturation specified from the color value becomes high, the color measurement error increases. The base of the configuration of the LUT 221*a* is the same as in the first exemplary embodiment, and thus, description thereof will not be repeated.

The color measurement data output unit 23 is a unit that outputs color measurement data including the error information generated by the error information generation unit 22*a* and the color value measured by the measurement unit 21*a*. The function of the color measurement data output unit 23 may be the same as in the first exemplary embodiment.

In this exemplary embodiment, the image reading apparatus 10 may obtain the image data from an information processing apparatus (for example, a personal computer) that supplies the image data for forming the image on the sheet type medium S to the image forming apparatus 100. Further, the control device 20 may measure the color of the image on the sheet type medium S supplied from the image forming apparatus 100 using the imaging unit 15 and may compare the measured color result with the color measurement data, to thereby perform a process of inspecting the quality of the image.

Modification Examples

The invention may be performed differently from the above-described exemplary embodiments. Further, the following modification examples may be combined with each other.

The image reading apparatus 10 of the first exemplary embodiment described above may generate and output color measurement data obtained by measuring the color of the image formed on the sheet type medium S based on the CMYK data for forming the image on the sheet type medium S described in the second exemplary embodiment. In this case, the image reading apparatus 10 may have the configuration described in the first exemplary embodiment and the configuration described in the second exemplary embodiment.

In this case, an algorithm necessary for the error information generation unit 22 to generate the error information may be different in a case where the imaged image data is used and a case where the CMYK data is used. For example, the error information generation unit 22 reduces the color measurement error in the case when the CMYK data is used, compared with the case where the imaged image data is used, to generate the error information. This is because if the image data used in the image formation is used, it is possible to specify the color values for each pixel in detail.

The modification example is not limited to this example. For example, the error information corresponding to the combination of the color values and the relative position of the measurement position with respect to the optical axis OP may be values that are obtained by experiment or calculation, for example, which may be written in the LUT 221 or the LUT 221*a*.

The above-described error information generation units 22 and 22*a* generate the error information based on the LUTs 221 and 221*a*, respectively, but may generate the error information by a method that does not use the lookup table. For example, the error information generation units 22 and 22*a* may perform calculation using a predetermined arithmetic expression to generate the error information.

The image reading apparatus 10 of the above-described exemplary embodiments images light of three primary colors of R, G and B, but the number or type of light to be imaged is not limited to this example. For example, the image reading apparatus 10 may image light of four colors including a BG (blue green) color in addition to the three primary colors of R, G and B.

Further, the image reading apparatus 10 may have a configuration in which the color separation prism 14 (color separation unit) is not provided. In this case, the image reading apparatus 10 includes a color line sensor of a three-line type as an imaging element, for example.

In the above-described second exemplary embodiment, the example in which the image forming apparatus 100 forms the image on the sheet type medium S by the four colors of C, M, Y and K, and the image reading apparatus 10 outputs the color measurement data based on the CMYK data is shown. The image forming apparatus 100 may form the image using toner of a color other than C, M, Y and K, or may form the image using toner of three or less colors or five or more colors. Similarly, in this case, the image reading apparatus 10 may generate and output color measurement data based on image data including color expressing values of a color space corresponding to the color of the toner used in the image forming apparatus 100.

Further, the image forming apparatus 100 may be an image forming apparatus that employs another method such as an inkjet type other than the electrophotographic type.

In the above-described exemplary embodiments, the image reading apparatus 10 generates and outputs the color measurement data based on the image data including the color values of the CIELAB color space. The image reading apparatus 10 may generate and output color measurement data based on image data including color values, an XYZ color system, a CIELUV color space or the like that is a color space of a color system that does not depend on the device, other than the CIELAB color space. Further, the image reading apparatus 10 may generate and output color measurement data based on image data including the color expressing values of the RGB color space as color values.

That is, the image data to be handled in the image reading apparatus 10 may be any image data as long as the image data includes color values from which the height of saturation of colors represented by an image of a color measurement object may be directly or indirectly specified.

In the above-described exemplary embodiments, the image reading apparatus 10 uses the image formed on the sheet type medium S such as an original document as the color measurement object, but the invention is not limited thereto. For example, the image reading apparatus 10 may use a test chart (color chart) used for calibration or evaluation of color reproducibility as a color measurement object. The test chart may be formed on the front surface (side surface) of the cylindrical transport medium 11, for example. In this case, the image reading apparatus 10 performs the calibration or the evaluation of color reproducibility based on the color measurement result of the test chart, and in this process, the error information may be used.

In the above-described exemplary embodiments, the image reading apparatus 10 is provided with one imaging unit 15 for each color of light to be imaged, but may be provided with plural imaging units 15 for each color of light to be imaged. In this case, the image reading apparatus 10 may have a configuration in which the adjacent imaging units 15 are arranged to be spaced from each other with intervals along the axial direction of the transport medium 11. In this case, since imaging regions of two adjacent imaging units 15 partially overlap with each other, it is possible to prevent a region that does not belong to the imaging regions from occurring on the sheet type medium S.

The image reading apparatus 10 of the above-described exemplary embodiments is not an example of a single apparatus being used. For example, the image reading apparatus 10 may have a configuration in which an image forming apparatus (for example, the image forming apparatus 100) that forms an image on a sheet type medium S is provided. Further, the image reading apparatus 10 may be realized as an image forming system including the image reading apparatus 10 and the image forming apparatus 100.

Further, the image reading apparatus 10 may use a fixedly placed sheet type medium S as the color measurement object, instead of the sheet type medium S transported by the transport medium 11. In this case, the image reading apparatus 10 may have a configuration for reading the front surface of the sheet type medium S while moving along the front surface of the sheet type medium S.

The respective functions realized by the above-described control devices 20 and 20a may be realized as one or plural hardware circuits, may be realized by executing one or plural programs by the control devices 20 and 20a, or may be realized by a combination thereof. When the functions of the control devices 20 and 20a are realized using a program, the program may be provided in the state of being stored in a computer readable recording medium such as a magnetic recording medium (a magnetic tape, a magnetic disk (a hard disk drive (HDD) or a flexible disk (FD)) or the like), an optical recording medium (an optical disc or the like), a magnetic optical recording medium or a semiconductor memory, or may be delivered through a network. Further, the invention may also be provided as an image reading method performed by a computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
an imaging unit that images light incident from a medium on which an image is formed;
a measurement unit that measures a color value on an image, based on image data obtained by the imaging unit, in correspondence with a position on the image;
a generation unit that generates error information indicating an error included in the color value, the error being calculated using the color value measured by the measurement unit and a relative position of the position on the image with respect to an optical axis of the imaging unit; and
an output unit that outputs the error information generated by the generation unit and the measured color value,
wherein the generation unit generates the error information in which the error becomes large as saturation specified from the color value becomes high.

2. An image reading apparatus comprising:
an imaging unit that images light incident from a medium on which an image is formed;

a measurement unit that measures a color value on an image, based on image data for forming an image on the medium, in correspondence with a position on the image;

a generation unit that generates error information indicating an error included in the color value, the error being calculated using the color value measured by the measurement unit and a relative position of the position on the image with respect to an optical axis of the imaging unit; and an output unit that outputs the error information generated by the generation unit and the measured color value, wherein the generation unit generates the error information in which the error becomes large as saturation specified from the color value becomes high.

3. The image reading apparatus according to claim 1,
wherein the measurement unit further measures the color value at the position on the image based on the image data for forming the image on the medium, and
wherein the generation unit generates the error information so that the error is different in a case where the image data obtained by the imaging is used and a case where the image data for forming the image is used.

4. The image reading apparatus according to claim 1,
wherein the generation unit generates the error information in which the error becomes large as the position on the image becomes distant from the optical axis.

5. The image reading apparatus according to claim 2,
wherein the generation unit generates the error information in which the error becomes large as the position on the image becomes distant from the optical axis.

6. The image reading apparatus according to claim 3,
wherein the generation unit generates the error information in which the error becomes large as the position on the image becomes distant from the optical axis.

7. An image reading method comprising:
imaging light incident from a medium on which an image is formed;
measuring a color value on an image, based on image data obtained by the imaging or based on image data for forming an image on the medium, in correspondence with a position on the image;
generating error information indicating an error included in the color value, the error being calculated using the measured color value and a relative position of the position on the image with respect to an optical axis; and
outputting the generated error information and the measured color value,
wherein the error information is generated in which the error becomes large as saturation specified from the color value becomes high.

8. The image reading apparatus according to claim 1,
wherein the generation unit that generates error information indicating the error included in the color value by comparing: (1) the color value measured by the measurement unit with (2) a predetermined calculated color value, wherein the predetermined color value is calculated based on (A) the color value measured by the measurement unit and (B) a relative position of the position on the image where the color value is measured with respect to an optical axis of the imaging unit.

* * * * *